United States Patent [19]

Winkler et al.

[11] Patent Number: 4,930,208

[45] Date of Patent: Jun. 5, 1990

[54] MACHINE TOOL

[75] Inventors: Hans-Henning Winkler, Tuttlingen; Eugen Rütschle, Mühleim, both of Fed. Rep. of Germany

[73] Assignee: Chiron-Werke GmbH & Co. KG, Tuttlingen, Fed. Rep. of Germany

[21] Appl. No.: 398,084

[22] Filed: Aug. 24, 1989

[30] Foreign Application Priority Data

Aug. 27, 1988 [DE] Fed. Rep. of Germany ....... 3829105

[51] Int. Cl.⁵ .............................................. B23Q 3/157
[52] U.S. Cl. ...................................... 29/568; 409/134
[58] Field of Search ............... 29/568, 26 A; 409/134, 409/144; 408/710; 184/6.27, 6.14; 211/1.5, 70

[56] References Cited

U.S. PATENT DOCUMENTS

| | | | |
|---|---|---|---|
| 3,930,302 | 1/1976 | Ochiai et al. | 29/568 |
| 4,196,506 | 4/1980 | Reed | 29/568 |
| 4,309,809 | 1/1982 | Yokoe et al. | 29/568 |
| 4,499,650 | 2/1985 | Cannon | 29/568 |
| 4,557,035 | 12/1985 | Rütschle et al. | 29/568 |

FOREIGN PATENT DOCUMENTS

| | | | |
|---|---|---|---|
| 3627515 | 8/1986 | Fed. Rep. of Germany . | |
| 3542506 | 6/1987 | Fed. Rep. of Germany | 29/568 |
| 2547230 | 6/1983 | France . | |
| 2179278 | 3/1987 | United Kingdom | 29/568 |

Primary Examiner—William Briggs
Attorney, Agent, or Firm—Pretty, Schroeder, Brueggemann & Clark

[57] ABSTRACT

A machine tool (10) comprises a revolving spindle (11). A plurality of tool holders (14) each of which is provided with a taper (13) and can be transferred by means of a gripper arm (20) from a magazine position remote from the spindle (11) and mounted by their tapers (13), one by one, in the spindle (11) in a machining position, while the other tool holders (14) remain in the magazine position. In order to avoid that metal chips may get into contact with and stick to the tapers (13) of the tool holders (14) while the latter are in the magazine position the tool holders (14) are accommodated in a cavity (40) providing a closed cover at least for the tapers (13).

5 Claims, 5 Drawing Sheets

MACHINE TOOL

The present invention relates to a machine tool having a revolving spindle and a plurality of tool holders each of which is provided with a taper and which can be transferred by means of a gripper arm from a magazine position remote from the spindle and mounted by their taper, one by one, in the spindle in a machining position, while the other tool holders remain in the magazine position.

A machine tool of this type has been known already from U.S. Pat. No. 4,557,035.

In the known machine tool, the spindle stock and the spindle are aligned relative to each other along a vertical axis and arranged for being displaced relative to a work table along several coordinate axes. The spindle stock is provided with a sleeve enclosing the spindle, which sleeve can be displaced in vertical direction relative to the spindle. The sleeve carriers a plurality of gripper arms mounted for pivotal movement substantially in a plane extending radially to the spindle axis. Each of the gripper arms is equipped with a parallelogram linkage and provided at its lower end with a gripper carrying a tool holder.

In one magazine position, the gripper arms together with the tool holders have been moved to a vertically upward position so that the tool holders with the tools mounted therein are arranged at a distance above and laterally from the spindle. For mounting a tool, one of the gripper arms is now moved downwardly, the insertion movement of the tool holder into the receptacle of the spindle being achieved by relative displacement of the sleeve along the spindle stock, irrespective of the absolute vertical position of the spindle relative to the work table.

In the case of the known machine tool, the tool holders are provided with standardized tapers which fit into a correspondingly shaped receptacle of the spindle.

However, given the very high and ever increasing cutting speeds and material removal rates usual today, it may happen in the case of the known machine tool that, when a machining operation is carried out using a first tool, large quantities of chips are thrown around at high speed in the working space of the machine tool. These metal chips, which are always wet with drilling coolant, may get into the area of the remaining tool holders which occupy a position vertically above and laterally spaced from the machining position. Now, if such a metal chip comes to stick to the taper of a tool holder, this may lead to problems if this tool holder is the next to be introduced into and to be mounted in the spindle.

Now, it is the object of the present invention to improve a machine tool of the type described above in such a way that trouble of the type described before is avoided.

This object is achieved according to the invention by the fact that while in the magazine position the tool holders are accommodated in a cavity providing a closed cover at least for the tapers.

This solves the problem underlying the invention fully and perfectly, the tapers of the tool holders being now protected in the magazine position from any metal chips flying about so that when mounting a tool holder no problems can arise in the area of the conical receptacle due to jammed metal chips.

In this connection, an additional particular advantage is seen in the fact that the arrangement of the tool holders in the magazine position relative to the receptacle of the spindle need not be changed, in particular that the distance need not be increased, as any increase of the distance would result in longer tool-changing times. In contrast, the basic design of the machine tool can be maintained unchanged so that the known short tool-changing times of conventional machine tools can be preserved.

According to a preferred embodiment of the invention, the tool holders held with their axes in substantially vertical arrangement on their way between the magazine position and the machining position, and the cavity is designed in the form of a downwardly open case.

This feature provides the advantage, in the case of machine tools with conventional vertical alignment of their tool holders, that the space is open only at the bottom so that there is very little probability that metal chips may get into the case so formed while a tool is in the machining position leaving its case empty.

According to another preferred feature of the invention, the gripper arms are spaced about the spindle and fastened on a common sleeve that can be displaced relative to the spindle, in the direction of the spindle axis, in which case the sleeve is provided with the cavity.

This feature provides the advantage that only slight modifications have to be applied to the machine tool described at the outset, in the area of the sleeve, in order to solve the problem underlying the invention.

According to a further preferred solution, each tool holder has assigned to it a separate cavity.

For, this feature provides the advantage that relatively small cavities have to be provided only, which may be designed, for example, as separate cases, caps, or the like. Further, any interaction between the individual cavities is excluded in this case so that even if a metal chip should happen to enter one of the cavities, for example when such cavity becomes accessible due to the respective tool having been transferred to the machining position, the remaining cavities will not be affected thereby.

According to another preferred embodiment of the machine tool according to the invention, a cover is arranged for closing the cavity when the respective tool holder is in the machining position.

This feature provides the substantial advantage that the metal chips cannot get into contact with the taper of the tool holder, not even indirectly, for example by penetrating into the open cavity of a tool holder, which has been temporarily removed from the cavity and transferred to the machining position, and cannot settle on the taper later after the taper has been returned to the respective cavity upon completion of the respective machining operation.

According to a particularly preferred variant of this embodiment of the invention, the cover consists of a sheet-steel part fixed to a hinged portion of the gripper arm and the sheet-steel part is automatically pivoted into a position in which it closes the cavity when the tool holder is transferred from the magazine position to the machining position.

This feature provides the particular advantage that no separate actuating means must be provided for closing the cavity because the sheet-steel part is moved automatically into a position in front of the opening of the cavity when the respective tool holder is transferred from the magazine position into the machining position.

Another advantage of this arrangement resides in the fact that the sheet-steel part may be designed in the most various forms, for example if other units located in the proximity of the machine tool are to be protected simultaneously.

Other advantages of the invention will appear from the specification and the attached drawing. It is understood that the features that have been described before and will be explained hereafter may be used not only in the described combinations, but also in any other combination, or individually, without leaving the scope and intent of the present invention.

One embodiment of the invention will now be described in more detail with reference to the drawing in which.

Figure 1:
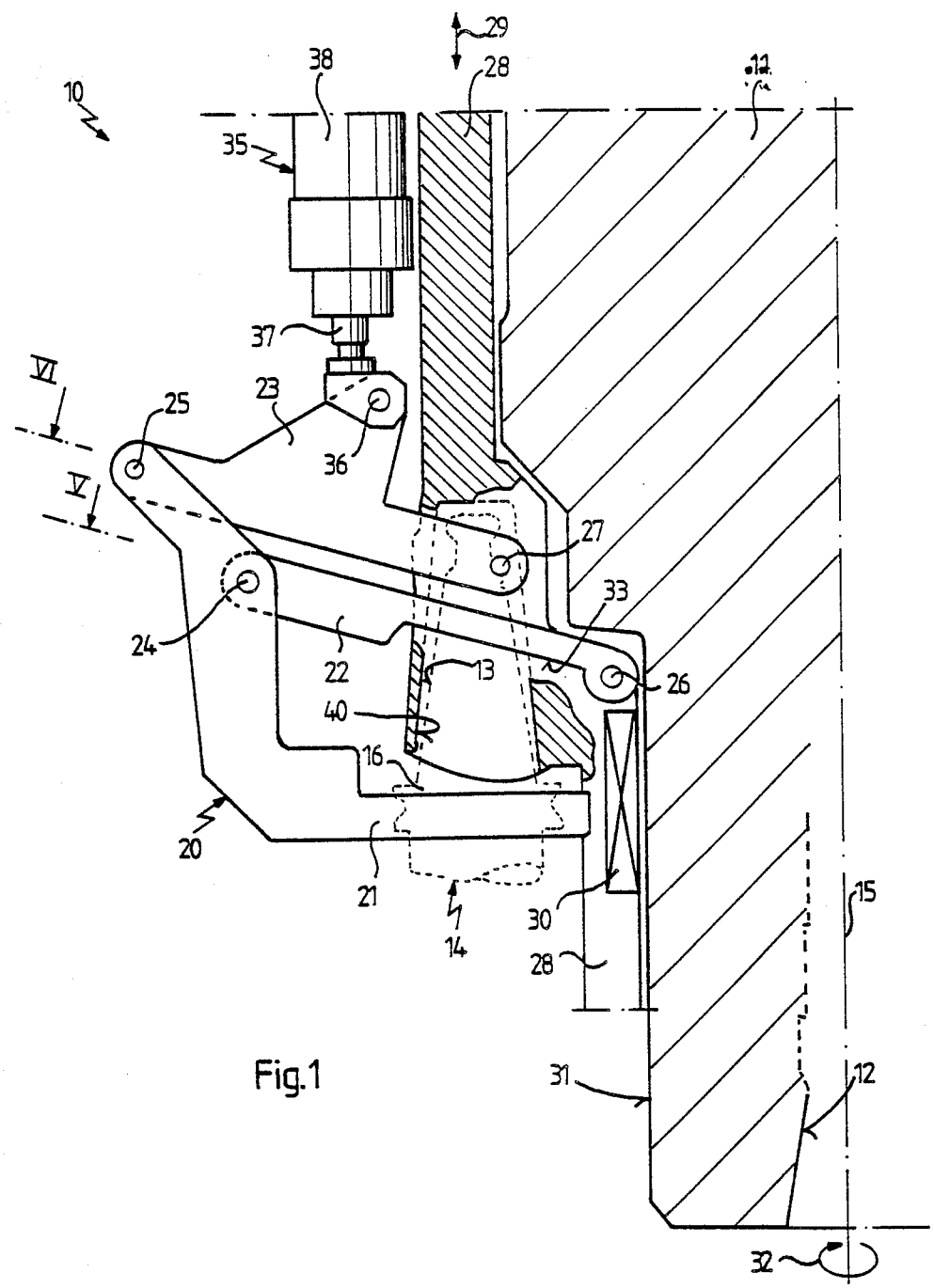
FIG. 1 shows a—partially sectional—side view of a tool-changing device of a machine tool according to the invention, with a tool holder in the magazine position.

In FIG. 1, reference numeral 10 indicates generally a machine tool having a spindle stock equipped with a revolving spindle 11 with a conical receptacle 12.

The receptacle 12 of the spindle 11 exhibits a configuration complementary to the taper 13 of a standardized tool holder 14. The tool holders 14 are held in the machine tool 10 in a position in which their axes extend parallel to a spindle axis 15. The tool holders 14 are provided, beneath the taper 13, with an annular flange 16 which is followed in downward direction by a tool, for example a drill or milling cutter.

In the case of the machine tool 10, a plurality of tool holder 14 are arranged the spindle 11 for being pivoted individually from the magazine position of the tool holders 14 illustrated in FIG. 1 into a machining position in the receptacle 12 of the spindle 11, as will be described in more detail further below with reference to FIGS. 2 and 3.

For mounting a tool holder 11 in the spindle 11, and for changing the tool later, a tool-changing device is provided consisting substantially of a gripper arm 20 operated by external power. The lower end of the gripper arm 20 takes the form of a gripper 21 designed for gripping the tool holder 14 in the area of its annular flange 16. Preferably, the gripper 21 is designed in such a manner that the tool holder 14 is permitted to rotate in the gripper 21 so that the latter need not be detached from the tool holder 14 in its machining position which helps reduce the required tool-changing times.

In order to ensure that the tool holder 14 will be aligned with its axis in vertical direction during all phases of the tool-changing process, the gripper 21 is part of a parallellogram linkage which further comprises a first rod 22 and a second rod 23 extending in parallel to the first rod. The rods 22, 23 are connected to the gripper 21 by a first axis 24 and a second axis 25 and supported, at their opposite ends, by a third axis 26 and a fourth axis 27, respectively. The axes 24 to 27 extend perpendicularly to the drawing plane of FIG. 1.

The third axis 26 and the fourth axis 27 are arranged on a sleeve 28 enclosing the spindle 11. The sleeve 28 can be displaced vertically relative to the spindle 11 in a manner known as such, as indicated in the drawing by arrow 29. As the spindle 11 revolves relative to the sleeve 28, a bearing 30 running on a cylindrical surface 31 of the spindle 11 is provided in the lower portion of the sleeve 28, between the sleeve 28 and the spindle 11. The sense of rotation of the spindle 11 is indicated by arrow 32. The first rod 22 is provided, at its lower face, with a recess 33 the purpose of which, relative to the bearing 30, will be described further below.

For operating the tool-changing device, a piston-and-cylinder unit 35 is connected to an upper projection of the second rod 23 via a fifth axis 36 extending in parallel to the axes 24 to 27. The piston-and-cylinder unit 35 consists substantially of a piston 37 which is articulated on the fifth axis 36, and a cylinder 38 pivoted by its upper end (not shown in FIG. 1) on a radial projection of the sleeve 28.

FIG. 1 shows the tool holder 14 in the magazine position in which the piston 37 is fully retracted into the cylinder 38 and in which the sleeve 28, too, occupies its upper end position relative to the spindle 11.

In the magazine position, the rods 22, 23 are aligned substantially horizontally, the axes 24, 25 extending a little above the axes 26, 27. The taper 13 of the tool holder 14 is located in this position in a cavity 40 provided at the lower face of a radial projection of the sleeve 28. The cavity 40 is designed in the form of a case enclosing at any time the taper of one of the plurality of tool holders 14.

Due to the fact that the taper 13 of the tool holder 14 is followed at its lower end by the radially projecting annular flange 16, the cavity 14 will be closed also at its bottom once the tool holder 14 is inserted. This means that the taper 13 is fully protected in the magazine position. Now, when the tool of another tool holder, being mounted in the spindle receptacle 12, is processing a work piece at high metal removal rates and flinging around a mixture of drilling coolant and metal chips, such metal chips are safely prevented from settling on the tapers 13 of the remaining tool holders 14 as all of them occupy their magazine positions and are fully enclosed in the cavity 40. Consequently, when later the taper 13 of another tool holder 14 is to be inserted into the spindle receptacle 12, during a subsequent tool-changing operation, there is no risk that metal chips sticking to the taper 13 may get jammed between the taper 13 and the spindle receptacle 12.

Figure 2:
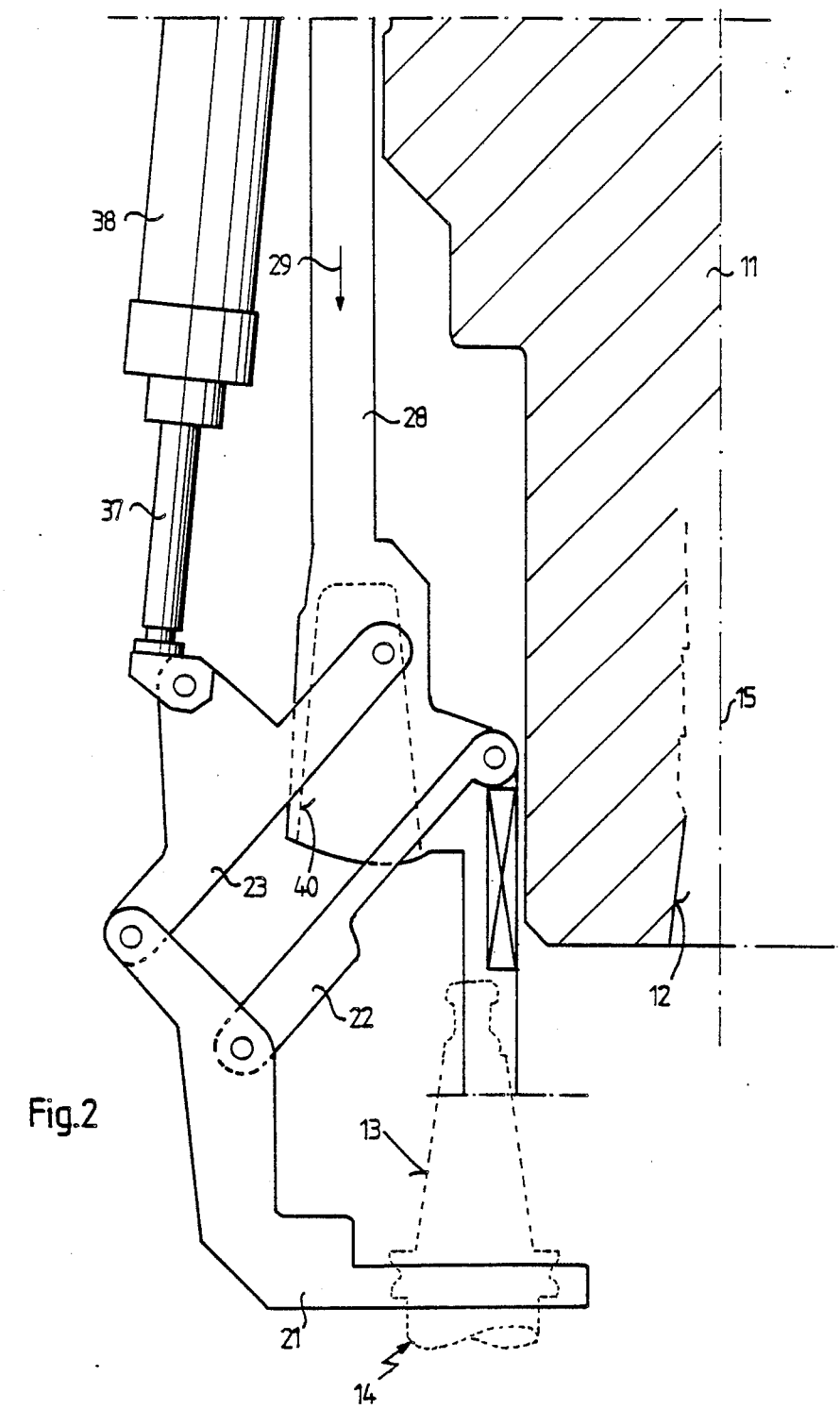
FIG. 2 shows a representation similar to that of FIG. 1, but with the tool holder in an intermediate position.

FIG. 2 shows an intermediate position in which the piston 37 has been extended from the cylinder 38 in downward direction. At the same time, the sleeve 28 has been displaced downwardly in the direction indicated by arrow 29. The rods 22, 23, therefore occupy a position slightly inclined towards the bottom and to the left. Due to the lowered position of the sleeve 28, the taper 13 of the tool holder 14 is now located below the lower edge of the spindle 11.

Figure 3:
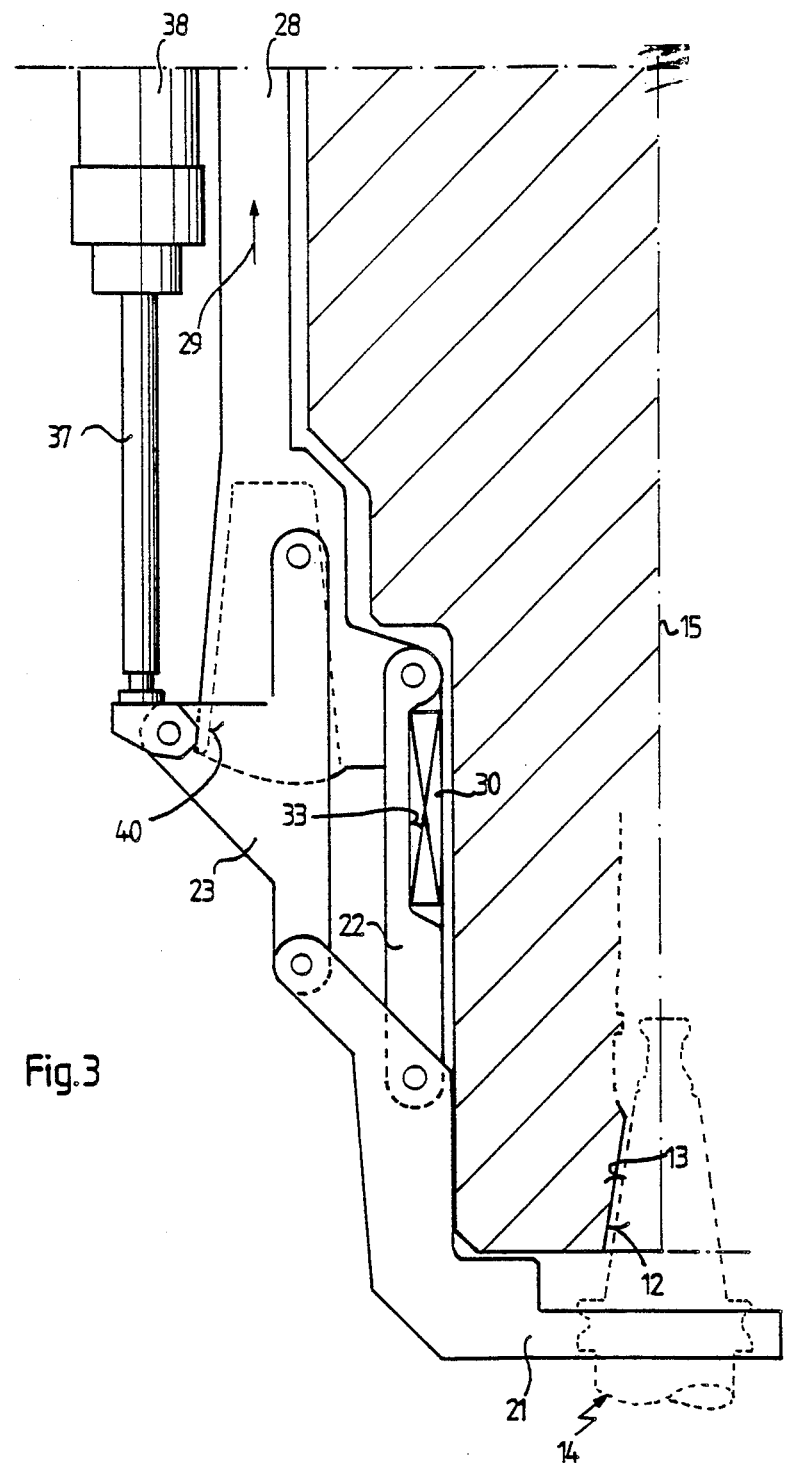
FIG. 3 shows another representation similar to that of FIG. 1, but with a tool holder in the machining position.

As will be seen best in FIG. 3, the arrangement is such that as the piston 37 is further extended, the rods 22, 23 are pivoted further in downward direction until they reach a vertical end position in which the tool holder 14 is in alignment with the spindle axis 15.

Now, when the sleeve 28 is displaced upwardly in this position, in the direction of arrow 29, the taper 13 of the tool holder 14 is inserted into the spindle receptacle 12 where the tool 14 can be fixed in place by means of usual collet chuck, or the like.

Figure 4:
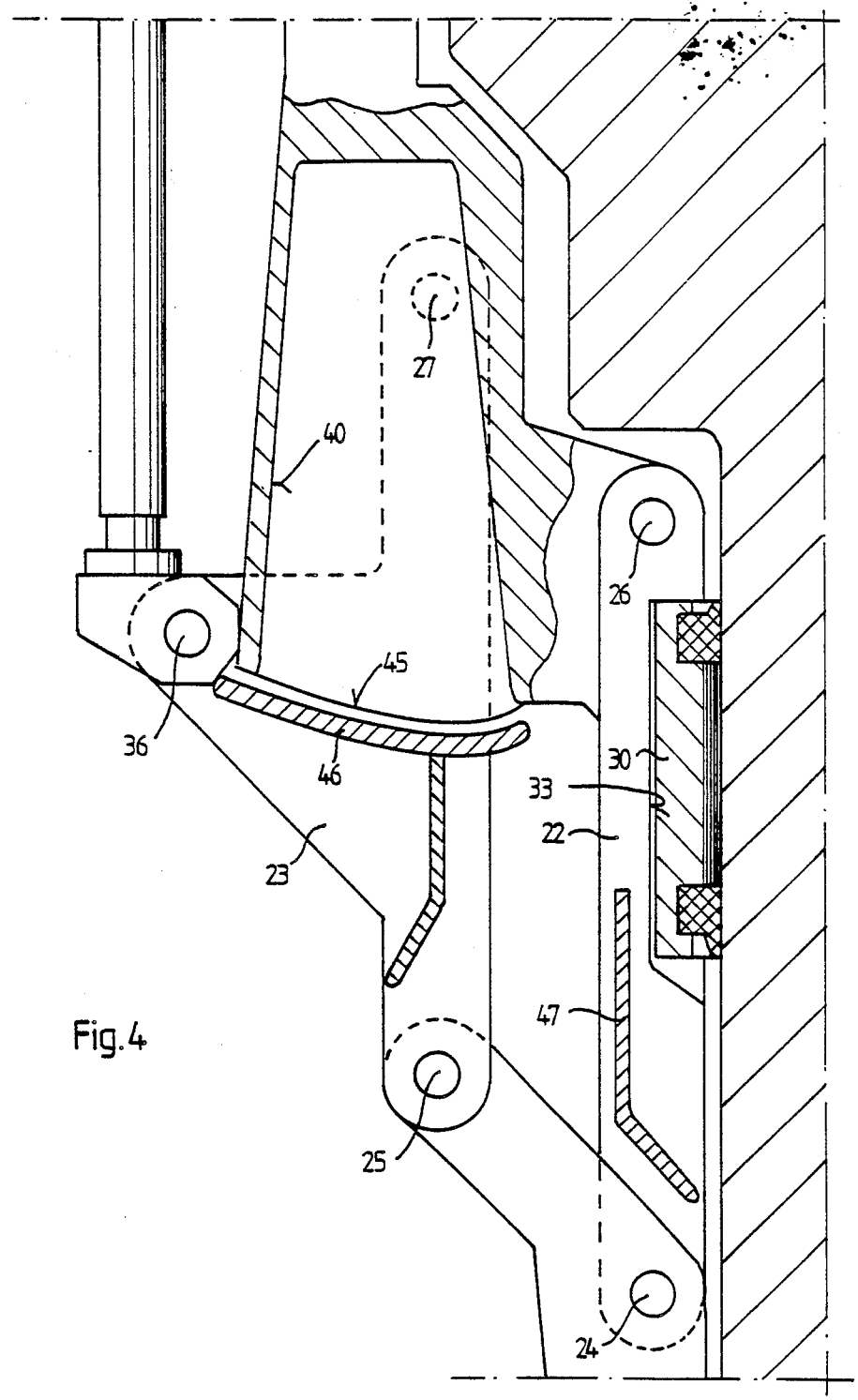
FIG. 4 shows a detail of FIG. 3, in enlarged scale, illustrating other particularities of the invention.

FIG. 4 shows additional details of the representation of FIG. 3. It will be seen firstly that the cavity 40 comprises a lower opening 45 which, normally, would be open when the respective tool holder occupies its machining position as it would then no longer be closed by the annular flange 16.

However, in order to prevent the chips from getting into the cavity 40, a first sheet-steel part 46 or a corresponding plastic part, extending substantially in vertical direction relative to the drawing plane of FIG. 4, is provided on the second rod 23. The first sheet-steel part 46 has approximately the shape of a segment of a hollow cylinder whose longitudinal axis coincides with the fourth axis 27. The same applies by analogy to the design of the lower opening 45 so that the first sheet-steel part 46 will be moved as closely as possible over the lower opening 45 when the second rod 23 is turned about the fourth axis 27. The lower opening 45 is covered up completely in this way when the second rod 23 occupies its lower extreme position illustrated in FIG. 4.

In addition, a similar second sheet-steel part 47 is provided on the first rod 22 which serves for covering the bearing 30 at its bottom.

From FIG. 4 it appears further that the bearing 30 fits exactly into the recess 33 of the first rod 22 when the latter occupies its lower extreme position.

The sheet-steel parts 46, 47 serve in addition as mechanical stiffening means for side pieces constituting the rods 22, 23.

Figure 5:
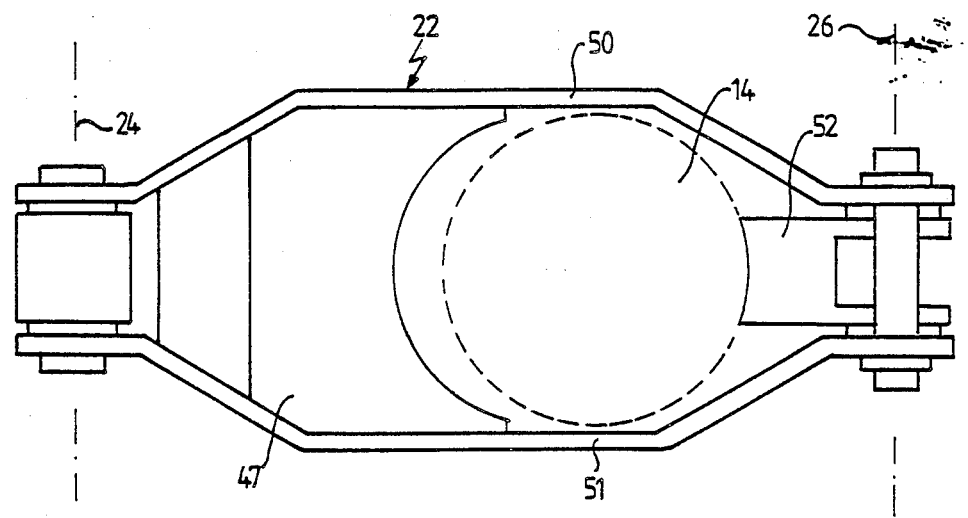
FIG. 5 shows a top view of a first rod of a gripper of the arrangements illustrated in FIGS. 1 to 4.

FIG. 5, for example, shows that the first rod 22 consists of two of these mirror-symmetrical side pieces 50, 51 which are united at their ends by axes 24, 26. The second sheet-steel part 47, which is provided with a corresponding recess in the form of an arc of a circle is arranged between these side pieces 50, 51 thus stiffening them. In addition, a first holder 52 may be arranged between the side pieces 50, 51 in order to prevent the tool holder 14 from tilting.

Figure 6:
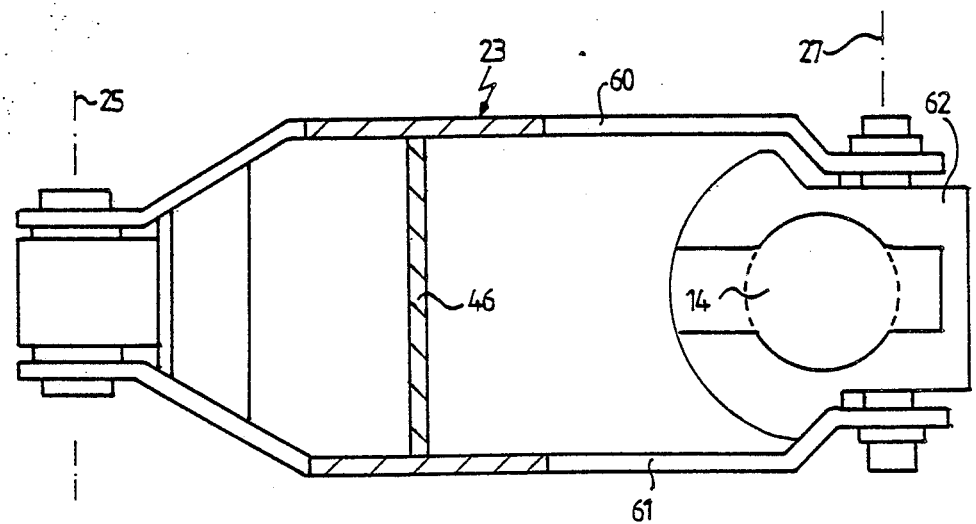
FIG. 6 shows a representation similar to that of FIG. 5, but illustrating another rod of the gripper.

FIG. 6 shows a similar representation of side pieces 60, 61 of the second rod 23. The first sheet-steel part 46, which now extends perpendicularly relative to the drawing plane of FIG. 6, performs again the function of stiffening means between the side pieces 60, 61. And again, a holder 62 is provided which prevents the tool holder 14 from tilting.

We claim:
1. A machine tool, comprising:
   a toolholder magazine for storing a plurality of toolholders, said toolholders having a tapered clamping section and a tool section;
   a spindle having rotatable receiving means for receiving said toolholder clamping sections;
   a plurality of transfer means, each of said transfer means being assigned to one predetermined toolholder for transferring said one toolholder from a magazine position within said toolholder magazine into a spindle position adjacent said receiving means and for inserting said clamping section into said receiving means; and
   splashguard means arranged at said toolholder magazine and having a plurality of tapered cavities for receiving and covering said tapered clamping sections of each of said toolholders when said toolholders are in said magazine position.

2. The machine tool of claim 1, wherein said toolholders are held substantially vertically when transferred between said magazine position and said spindle position, said cavities being designed to open downwardly.

3. The machine tool of claim 1, wherein said transfer means comprise gripper arms being distributed with equal spacings about said spindle and being fastened on a common sleeve, said sleeve being displaceable relative to said spindle in a direction of a spindle axis, said sleeve being provided with said cavities.

4. The machine tool of claim 1, wherein said splashguard means are provided with cover means for closing said cavities when the respective toolholder is in said spindle position.

5. The machine tool of claim 4, wherein said cover means consists of a sheet-steel part fixed to a hinged portion of a gripper arm of said transfer means, said sheet-steel part being automatically pivoted into a closing position to close said cavity when said toolholder is transferred from said magazine position to said machining position.

* * * * *